United States Patent
Jones et al.

(10) Patent No.: US 10,501,001 B2
(45) Date of Patent: Dec. 10, 2019

(54) SENSOR SYSTEMS AND METHODS FOR MONITORING UNLOADING OF CARGO

(71) Applicant: Walmart Apollo, LLC, Bentonville, AR (US)

(72) Inventors: Nicholaus Adam Jones, Fayetteville, AR (US); Aaron Vasgaard, Fayetteville, AR (US); Robert James Taylor, Rogers, AR (US); Matthew Allen Jones, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/204,351

(22) Filed: Nov. 29, 2018

(65) Prior Publication Data
US 2019/0092207 A1 Mar. 28, 2019

Related U.S. Application Data

(63) Continuation of application No. 15/452,977, filed on Mar. 8, 2017, now Pat. No. 10,173,573.
(Continued)

(51) Int. Cl.
*B60P 1/38* (2006.01)
*G01B 11/14* (2006.01)
(Continued)

(52) U.S. Cl.
CPC ............... *B60P 1/38* (2013.01); *G01B 11/14* (2013.01); *G01B 11/22* (2013.01); *G01B 17/00* (2013.01);
(Continued)

(58) Field of Classification Search
CPC ..... B60P 1/38; B65G 2203/042; B65G 67/08; G01B 11/14; G01B 11/22; G01B 17/00; G06Q 10/083
See application file for complete search history.

(56) References Cited

U.S. PATENT DOCUMENTS

| 4,701,091 A | 10/1987 | Yamauchi et al. |
| 6,332,098 B2 | 12/2001 | Ross et al. |
| (Continued) | | |

FOREIGN PATENT DOCUMENTS

| CN | 1329224 C | 1/2002 |
| CN | 201932055 U | 8/2011 |
| (Continued) | | |

OTHER PUBLICATIONS

Combined Seach and Examination Report from related Great Britain patent application No. GB1814208.3 dated Feb. 11, 2019.
(Continued)

*Primary Examiner* — Tyler J Lee
(74) *Attorney, Agent, or Firm* — McCarter & English, LLP; David R. Burns

(57) ABSTRACT

Sensor systems, methods and machine readable medium are provided for a cargo vehicle. A plurality of sensors are arranged about an opening associated with a door through which packages are unloaded from a vehicle or trailer. The plurality of sensors are configured to measure an unpacked depth of the vehicle or trailer. A processor is provided in communication with each of the plurality of sensors. The processor is configured to receive measured data generated by the plurality of sensors, determine an empty volume over time of the vehicle or trailer based on the measured data as packages are being unpacked from the vehicle or trailer, and generate instructions regarding loading packages in a subsequent vehicle or trailer based on the determined empty volume over time of the vehicle or trailer.

20 Claims, 6 Drawing Sheets

Related U.S. Application Data

(60) Provisional application No. 62/306,161, filed on Mar. 10, 2016.

(51) Int. Cl.
  *G01B 11/22* (2006.01)
  *G01B 17/00* (2006.01)
  *B65G 67/08* (2006.01)
  *G06Q 10/08* (2012.01)

(52) U.S. Cl.
  CPC .......... *G06Q 10/083* (2013.01); *B65G 67/08* (2013.01); *B65G 2203/042* (2013.01)

(56) References Cited

U.S. PATENT DOCUMENTS

| | | | |
|---|---|---|---|
| 6,894,636 | B2 | 5/2005 | Anderton et al. |
| 8,330,817 | B1* | 12/2012 | Foster .............. G08B 13/19647 |
| | | | 296/186.1 |
| 9,321,601 | B2 | 4/2016 | Pippin |
| 9,738,466 | B2 | 8/2017 | Pippin |
| 10,161,746 | B2* | 12/2018 | Ochsendorf .......... G01B 11/28 |
| 2002/0092728 | A1 | 7/2002 | Tanaka |
| 2003/0189510 | A1 | 10/2003 | Anderton et al. |
| 2004/0125217 | A1 | 7/2004 | Jesson et al. |
| 2005/0199782 | A1 | 9/2005 | Calver et al. |
| 2007/0013519 | A1 | 1/2007 | Chung et al. |
| 2007/0264111 | A1 | 11/2007 | Cooper |
| 2008/0317567 | A1 | 12/2008 | Rother et al. |
| 2009/0099775 | A1 | 4/2009 | Mott et al. |
| 2010/0213313 | A1 | 8/2010 | Reed et al. |
| 2012/0087770 | A1 | 4/2012 | Pippin |
| 2012/0092643 | A1 | 4/2012 | Rintanen et al. |
| 2012/0283868 | A1 | 11/2012 | Rutt et al. |
| 2013/0230373 | A1 | 9/2013 | Pippin |
| 2013/0293539 | A1 | 11/2013 | Hunt et al. |
| 2013/0342653 | A1* | 12/2013 | McCloskey ........... G01S 17/026 |
| | | | 348/46 |
| 2013/0343848 | A1 | 12/2013 | Wangen |
| 2014/0199142 | A1 | 7/2014 | Criswell |
| 2014/0372182 | A1 | 12/2014 | Groble et al. |
| 2014/0372183 | A1 | 12/2014 | Groble et al. |
| 2015/0360882 | A1 | 12/2015 | Girtman |
| 2016/0047646 | A1* | 2/2016 | Ochsendorf ........... G01B 11/28 |
| | | | 348/148 |
| 2016/0280477 | A1 | 9/2016 | Pippin |
| 2017/0190521 | A1 | 7/2017 | Jones et al. |
| 2017/0228885 | A1 | 8/2017 | Baumgartner |
| 2017/0312789 | A1 | 11/2017 | Schroader |
| 2018/0042176 | A1 | 2/2018 | Obropta et al. |

FOREIGN PATENT DOCUMENTS

| | | |
|---|---|---|
| CN | 102765681 A | 11/2012 |
| EP | 2910472 A1 | 8/2015 |
| FR | 3015386 A1 | 6/2015 |
| JP | 2000142206 A | 5/2000 |
| WO | 199708628 A1 | 3/1997 |
| WO | 2008153757 A1 | 12/2008 |
| WO | 2017200865 A1 | 11/2017 |

OTHER PUBLICATIONS

Combined Seach and Examination Report from related Great Britain patent application No. GB0703635.1 dated Sep. 6, 2017.

* cited by examiner

SENSOR SYSTEMS AND METHODS FOR MONITORING UNLOADING OF CARGO

RELATED APPLICATION

This application is a continuation of U.S. patent application Ser. No. 15/452,977 filed on Mar. 8, 2017, which claims priority to U.S. Provisional Patent Application No. 62/306,161 filed on Mar. 10, 2016, the content of both are hereby incorporated by reference in their entirety.

BACKGROUND

Often, a cargo vehicle or trailer contains separately-packed items in the form of boxes. The cargo vehicle is often loaded by workers in a particular manner. Then, the packages from the cargo vehicle are unloaded by workers at a loading dock for delivery. The loading and unloading of the packages may be improved which can lead to increase productivity and enhanced safety of the workers.

SUMMARY

In one embodiment, a sensor system is provided. The system includes a first plurality of sensors arranged about an opening associated with a door through which packages are unloaded from a vehicle or trailer. The first plurality of sensors are configured to measure an unpacked depth of the vehicle or trailer. The system also includes a processor in communication with each of the first plurality of sensors. The processor is configured to receive first measured data generated by the first plurality of sensors, determine an empty volume over time of the vehicle or trailer based on the first measured data as packages are being unpacked from the vehicle or trailer, and generate instructions regarding loading packages in a subsequent vehicle or trailer based on the determined empty volume over time of the vehicle or trailer.

In another embodiment, a computer-implemented method is provided. The method includes receiving first measured data generated by a first plurality of sensors arranged about an opening associated with a door through which packages are unloaded from a vehicle or trailer. The method also includes determining an empty volume over time of the vehicle or trailer based on the first measured data as packages are being unpacked from the vehicle or trailer, and generating instructions regarding loading packages in a subsequent vehicle or trailer based on the determined empty volume over time of the vehicle or trailer.

In yet another embodiment, a non-transitory computer readable medium is provided. The computer readable medium stores instructions which when executed cause a processor to implement a method. The method includes receiving first measured data generated by a first plurality of sensors arranged about an opening associated with a door through which packages are unloaded from a vehicle or trailer, determining an empty volume over time of the vehicle or trailer based on the first measured data as packages are being unpacked from the vehicle or trailer, and generating instructions regarding loading packages in a subsequent vehicle or trailer based on the determined empty volume over time of the vehicle or trailer.

In some embodiments, each of the first plurality of sensors is a distance measuring sensor. In some embodiments, the first plurality of sensors are disposed at the door in a horizontal array and a vertical array to form a grid arrangement. In other embodiments, the door is associated with a loading dock, and the method and system further include determining an amount of time spent to move a separately-packed item from a first location inside of the cargo container to a second location onto the loading dock.

In some embodiments, the system and method further include sensing location of a package on a conveyor belt having a first end configured to be disposed in the vehicle or trailer and a second end configured to be disposed proximate to the door, the conveyor belt configured to transport packages from the vehicle or trailer through the door, and determining a rate of unloading or unpacking based on second measured data generated by the second plurality of sensors on the conveyor belt.

In some embodiments, the system and method further include determining a first rate of unloading or unpacking corresponding to the vehicle or trailer based on the empty volume over time, determining a second rate of unloading or unpacking corresponding to the subsequent vehicle or trailer, and comparing the first rate and the second rate to determine efficiency of unloading or unpacking the subsequent vehicle or trailer.

In some embodiments, the system and method further include detecting a safety issue associated with unloading the cargo container based on the first measured data, and generate an alert to provide a warning related to the safety issue.

BRIEF DESCRIPTION OF THE DRAWINGS

The accompanying drawings, which are incorporated in and constitute a part of this specification, illustrate one or more embodiments of the present disclosure and, together with the description, help to explain the present disclosure. The embodiments are illustrated by way of example and should not be construed to limit the present disclosure. In the drawings.

DETAILED DESCRIPTION

Systems, methods, and computer readable mediums are described for a sensor system for a cargo vehicle or trailer. Exemplary embodiments provide a sensor system including multiple sensors disposed at a loading dock area to measure a rate of unpacking of a cargo or goods vehicle or trailer. Example embodiments provide a plurality of sensors disposed about an opening or door of a loading dock or other unloading area. The plurality of sensors are configured to measure an unpacked depth of the vehicle or trailer as packages are unloaded from the vehicle or trailer. The sensors measure data, and a processor determines an empty volume over time for the vehicle or trailer based on the measured data as packages are being unloaded from the vehicle or trailer. In this manner, the efficiency of unloading the vehicle or trailer can be determined. The processor also generates instructions for loading packages in a subsequent vehicle based on the determined empty volume over time of the instant vehicle or trailer.

Exemplary embodiments also compare an empty volume over time for a first vehicle or trailer with an empty volume over time for a second vehicle or trailer to determine efficiency of unloading the first vehicle. If the unloading of the first vehicle is efficient, then the sensor system generates instructions to load packages in another vehicle based on the manner in which the first vehicle was loaded.

As used herein, "loading dock" refers to any industry loading dock or area where cargo is unloaded from a transport vehicle. A loading dock or loading bay can be an area of a building where goods or cargo vehicles are loaded and unloaded. They are commonly found on commercial buildings, residential buildings, industrial buildings, warehouses, and the like. Loading docks may be exterior, flush with the building envelope, or fully enclosed. They are part of a facility's service or utility infrastructure, typically providing direct access to staging areas, storage rooms, and freight elevators.

A vehicle may refer to a vehicle or trailer for transporting cargo, goods, packages, containers, etc., that can be loaded or unloaded at a loading dock. A vehicle as used herein, may include, but is not limited to, any size of truck, cargo or goods container, trailer, goods transporter, and the like. Packages as used herein may refer to, but is not limited to, boxes, containers, goods, cargo, and the like.

An "unpacked depth" as used herein, refers to a depth of the vehicle that is empty after zero, some, or all packages have been unpacked or unloaded from a vehicle, and an "empty volume" as used herein, refers to a volume of a vehicle that is empty after zero, some or all of the packages have been unpacked or unloaded from a vehicle. The empty volume of a vehicle may be calculated, determined or measured over time based on the unpacked depth of the vehicle measured by the sensors.

Figure 1:
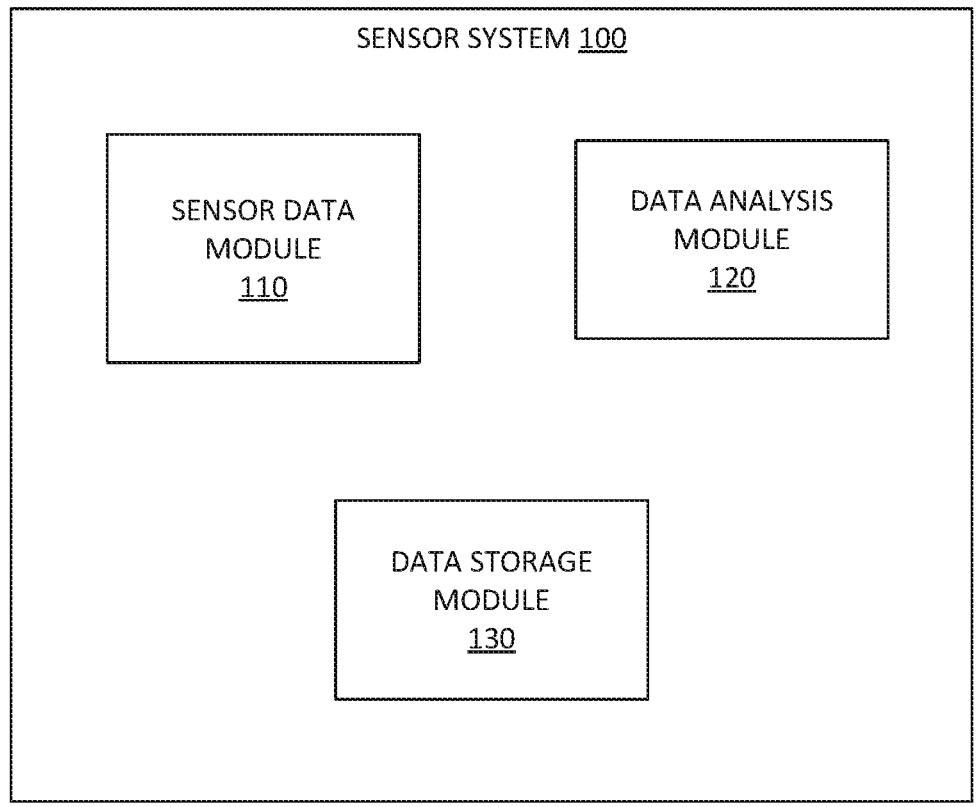
FIG. 1 is a block diagram showing an exemplary sensor system for a cargo vehicle, according to example embodiments.

FIG. 1 is a block diagram showing a sensor system 100 in terms of modules according to an example embodiment. The one or more of the modules may be implemented in device 520 shown in FIG. 5. The modules include a sensor data module 110, a data analysis module 120, and a data storage module 130. The modules may include various circuits, circuitry and one or more software components, programs, applications, or other units of code base or instructions configured to be executed by one or more processors (e.g., included in the device 520 shown in FIG. 5). In other embodiments, one or more of modules 110, 120, 130 may be included in server (e.g., server 530 shown in FIG. 5), while other of the modules 110, 120, 130 are provided in client device (e.g., device 520 shown in FIG. 5). Although modules 110, 120, and 130 are shown as distinct modules in FIG. 1, it should be understood that modules 110, 120, and 130 may be implemented as fewer or more modules than illustrated. It should be understood that any of modules 110, 120, and 130 may communicate with one or more components included in exemplary embodiments of the present disclosure (e.g., sensors 510, device 520, server 530, or database(s) 540 of system 500 shown in FIG. 5).

The sensor data module 110 may be configured to receive and manage data measured or sensed by sensors, and maintain and control the sensors. The data analysis module 120 may be configured to manage and analyze data from the sensors to determine, at least, an empty volume of a vehicle, and manage and generate instructions for loading of other vehicles. The data storage module 130 may be configured to manage and store data related an empty volume of a vehicle.

Figure 2:
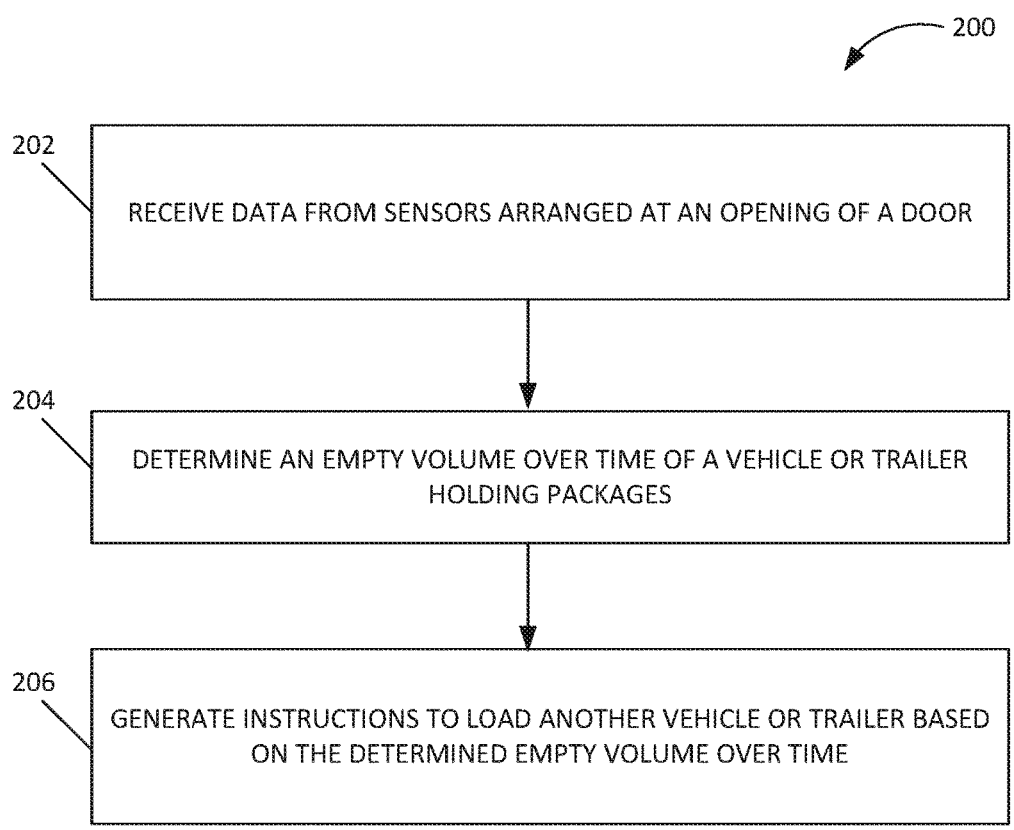
FIG. 2 is a flowchart illustrating an exemplary process implemented by the sensor system for a cargo vehicle, according to example embodiments.

FIG. 2 is a flowchart illustrating an exemplary process 200 for using the sensor system described herein, according to example embodiments. The system 200 may be performed using or one or more modules of system 100 described above.

Figure 3:
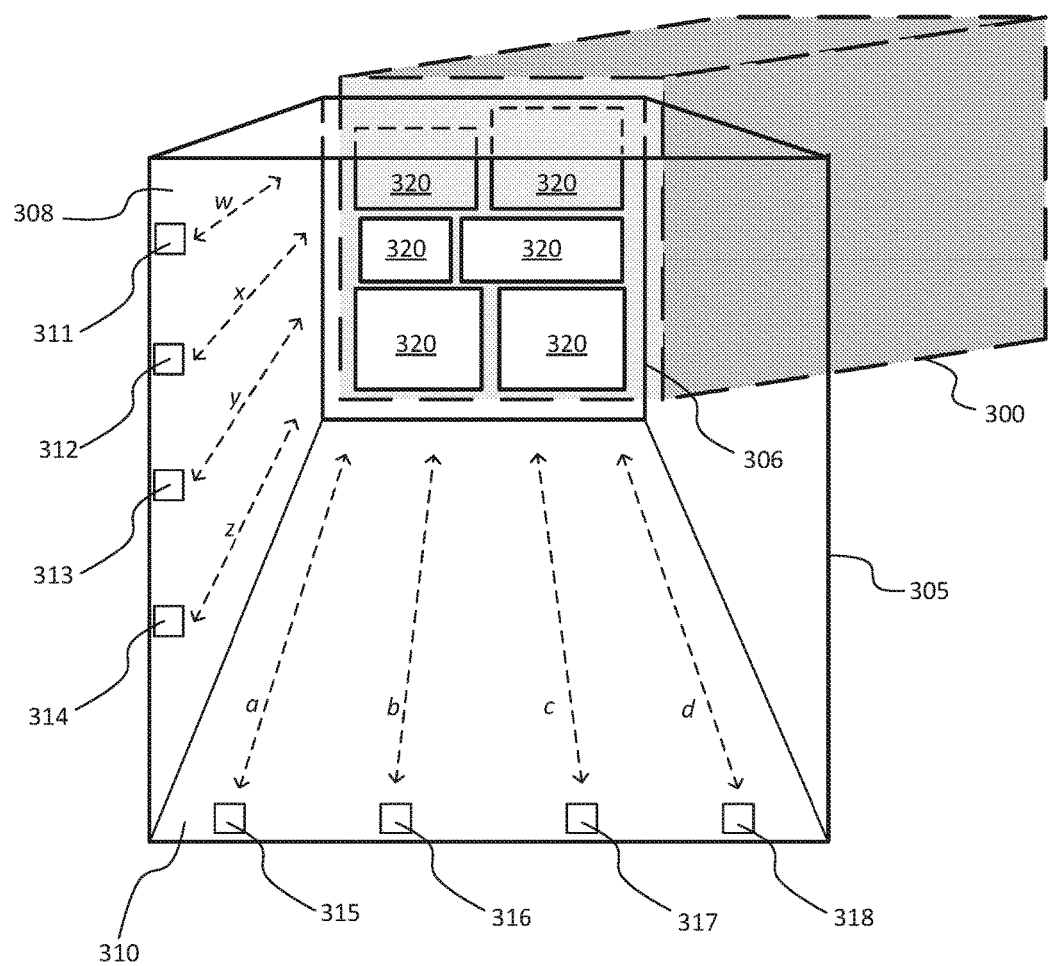
FIG. 3 schematically depicts an exemplary arrangement of sensors at a loading dock with a cargo vehicle, according to example embodiments.

The process 200 begins at step 202 where the sensor data module 110 receives data from sensors arranged at an opening of a door of a loading dock. In an example embodiment, a plurality of sensors are arranged (e.g., in one or more arrays) about an opening associated with a door through which packages are unloaded from a vehicle or trailer. As a non-limiting example, the sensors may be arranged as illustrated in FIG. 3. The plurality of sensors are configured to measure an unpacked depth of the vehicle or trailer. The sensors may be disposed at the loading dock in a horizontal array and/or a vertical array to form a grid arrangement (as shown in FIG. 3). Each sensor may be spaced apart a certain distance, for example, approximately four inches. In some embodiments, the sensor system accounts for tunneling effect when forming the grid arrangement. For example, one or more of the sensors at the opening of the loading dock may be arranged at an angle with respect to the boundaries of the volume to be sensed, which can cause the sense signals emitted from the sensors (e.g., reflective-type sensor utilizing lasers) to propagate diagonally through the truck (e.g., in a direction that is not parallel to the sides, bottom, and/or top of a cargo container). Such diagonal emissions of the sense signals generally cannot be directly correlated to a distance measured by the sensors and the empty volume of the vehicle or trailer. Exemplary embodiments of the present disclosure (e.g., the device 520 and/or server 530) can account for such diagonal emissions, for example, based on a known geometry of the volume of the truck being measured and the angle at which the sense signals propagate through the volume to be measured.

Figure 4:
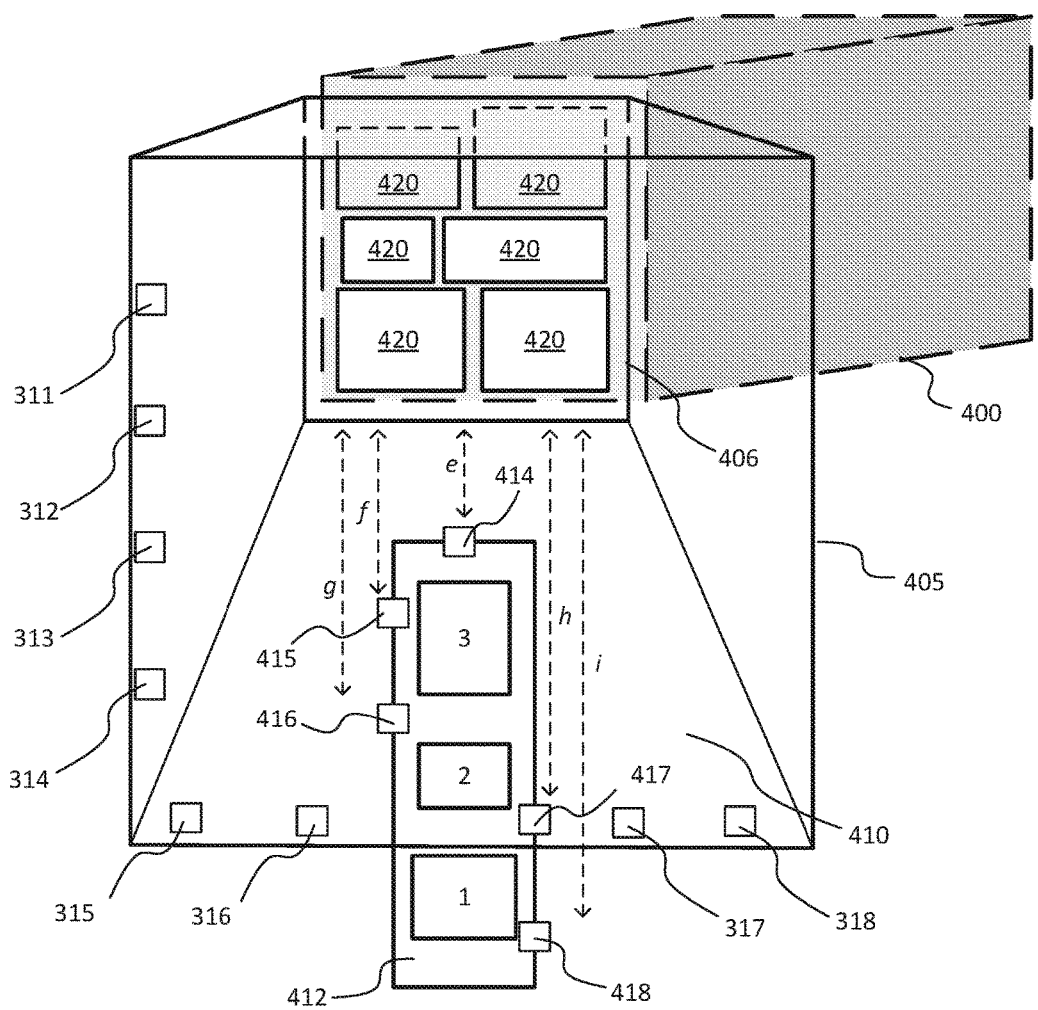
FIG. 4 schematically depicts an exemplary arrangement of sensors at a loading dock with a cargo vehicle and conveyor belt, according to example embodiments.

In exemplary embodiments, a plurality of sensors can be arranged about a conveyor belt, where the conveyor belt has a first end configured to be disposed in the vehicle or trailer and a second end configured to be disposed proximate to the door. For example, the sensors may be arranged as illustrated in FIG. 4. The conveyor belt is configured to transport a package from the vehicle or trailer through the door onto the loading area. The sensors are configured to sense a location of package on the conveyor belt. The sensors are also configured to sense when a package has been unpacked and placed on the conveyor belt.

In exemplary embodiments, sensors can be provided in a vertical array along one or both sides of the loading dock opening. Additionally, or in the alternative, a horizontal array of sensors can be provided along the floor of the loading dock and/or along the upper side of the opening. In yet another embodiment, one sensor may be provided that oscillates back and forth (e.g., left to right and/or up and down) within the loading dock door (e.g., along a bottom, sides, and/or top of the loading dock opening). The oscillating movement allows the sensor to replace an array of sensors to measure distance data between the sensor and the packages in the vehicle. In yet another embodiment, a scanner mechanism (e.g., using laser technology) may be provided to scan the inside of the vehicle to determine an unpacked depth of the vehicle at various time periods.

The sensors of the system are in communication with a processor (e.g., processor of device 520 or server 530). In an example embodiment, the sensors can be distance measuring sensors and can utilize electromagnetic radiation, such as light, and/or acoustic radiation, such as, pressure waves. For example, the sensors can utilize lasers that transmit coherent radiation into a cavity or area of a vehicle or trailer. The data measured by the sensors disposed at the loading dock door is transmitted to the processor.

At step 204, the data analysis module 120 determines an empty volume over time of the vehicle or trailer based on the measured data from the sensors as packages are being unpacked or unloaded from the vehicle or trailer. The empty volume may be determined by a processor (e.g., a processor of device 520 shown in FIG. 5), and transmitted to a server (e.g., server 530 shown in FIG. 5). The plurality of sensors periodically measures a distance between the sensor and one or more packages within the vehicle or trailer. Thus, the sensors are able to identify a change in distance when a package is removed from its original packed location within the vehicle or trailer to be unpacked or unloaded from the vehicle or trailer. The change in distance is used to determine an empty volume of the vehicle or trailer over time. In other words, a rate at which the vehicle or trailer is unloaded can be determined using data measured by the sensors. In some embodiments, the sensor data module 110 associates a timestamp with the measured data indicating when the data was measured. The data analysis module 120 can use the timestamp information to determine an amount of time spent to move a package from a first location inside of the vehicle or trailer to a second location onto loading dock.

In an example embodiment, the data storage module 130 stores data related to the determined empty volume over time for the instant vehicle or trailer. This first empty volume over time is compared with another empty volume over time that was determined for another vehicle or trailer. The data storage module 130 also facilitates storing of empty volume over time that was determined for other vehicles and trailers in a database (e.g., database(s) 540 of FIG. 5). The empty volume over time for the other vehicles or trailers may have been previously determined at the same or different loading dock. The other vehicles or trailers may hold packages similar to the instant vehicle or trailer, or it may hold packages different from the instant vehicle or trailer. By comparing the empty volume over time for the instant vehicle with the empty volume over time for other vehicles, the sensor system 100 may determine whether the unloading of the instant vehicle was efficient or inefficient. This determination of efficiency may be stored in a database as associated with the instant vehicle, and also may be with a particular loading dock or store location.

At step 206, the data analysis module 120 generates instructions to load another vehicle or trailer based on the determined empty volume over time for the instant vehicle or trailer. The instructions may be generated by server 530. If the empty volume over time for the instant vehicle is determined to be an efficient unloading of the vehicle, the data analysis module 120 generates instructions to load or pack another vehicle according to the manner in which the instant vehicle was loaded or packed. In this manner, measuring data related to unloading of packages from a vehicle or trailer can be used to determine whether the unloading was efficient, and if it was efficient, then other vehicles or trailers should be loaded according to the instant vehicle.

In an example embodiment, the instructions generated at step 206 are used to load another vehicle or trailer. When this vehicle or trailer is unloaded at a loading dock, a plurality of sensors disposed at the loading dock measures distance between the packages and the sensor, and an empty volume over time for this vehicle or trailer is determined (according to method 200). The empty volume over time determined here is compared with other empty volume over time data to determine whether it was efficient or inefficient. As such, the sensor system provides a feedback loop to continuously test the efficiency of the unloading process and to continuously recommend a more efficient loading process.

In an example embodiment, the data measured by the sensors can be used to detect a safety issue associated with the unloading of the packages from the vehicle. For example, a worker may unload the package in a manner that causes the other packages to fall causing a safety concern. The data measured by the sensors can indicate an abnormal change in distance, and the sensor system 100 may detect a safety issued based on the measured data. In response, the sensor system may generate an alert to provide a warning related to the safety issue. The alert may be displayed on device 520.

FIG. 3 schematically depicts an exemplary arrangement of sensors at a loading dock with a cargo vehicle, according to example embodiments. As described above, in one embodiment, sensors 311-318 are arranged about a loading dock 305. In particular, the sensors 311-318 are arranged so that they are facing towards the loading dock opening 306. In exemplary embodiments, the sensors 311-318 can be reflective-type sensors that emit a sense signal and receive/detect reflection of the sense signal from one or more objects (e.g., packages) upon which the sense signal impinge. The distance between the sensors 311-318 and the one or more packages can be determined based on a time of travel of the sense signals to an object and a time of travel of the reflected signals back to the sensors and/or changes in frequencies between the transmitted sense signals and the received reflected signals. A vehicle or trailer 300 (hereafter "vehicle 300") containing packages, goods, cargo, containers etc. (hereafter "packages 320") can be unloaded onto the loading dock 305 via the dock opening 306. As illustrated in FIG. 3, the vehicle 300 is backed up close to the dock opening 306, so that packages 320 can be unloaded from the vehicle 300. As described above, in an example embodiment, multiple sensors can be arranged about the loading dock 305 in a grid arrangement. For example, sensors 311-314 are arranged in a vertical array along loading dock wall 308, and sensors 315-318 are arranged in a horizontal array along loading dock floor 310. As described above, in an example embodiment, the sensors 311-318 are distance sensors, and are arranged about the loading dock 305 to measure an unpacked depth of the vehicle 300 based on the unloading of packages 320.

As illustrated in FIG. 3, sensor 311 measures distance w from the sensor 311 to the packages 320 in the truck 300. Similarly, sensor 312 measures distance x, sensor 313 measures distance y, sensor 314 measures distance z, sensor 315 measures distance a, sensor 316 measures distance b, sensor 317 measures distance c, and sensor 318 measures distance d. In some embodiments, the position or location of the plurality of sensors is recorded. Based on which sensor is measuring a change in distance, the sensor system can determine which package is being unloaded. For example, if sensor 311 measures a change in distance, then the top right corner package has been unloaded. If sensor 318 measures a change in distance, then the bottom left package has been unloaded.

Thus, as illustrated in FIG. 3, multiple sensors are arranged about a loading dock to measure data related to an unpacked depth of a vehicle or trailer.

FIG. 4 schematically depicts an exemplary arrangement of sensors at a loading dock with a cargo vehicle and conveyor belt, according to example embodiments. As described above, in another embodiment, multiple sensors 414-418 are arranged about a conveyor belt 412 at a loading dock 405 with or without the sensors 311-318. In particular, the sensors 414-418 are arranged so that they are facing towards the loading dock opening 406. In exemplary embodiments, the sensors 414-418 can be reflective-type sensors. A vehicle or trailer 400 (hereafter "vehicle 400") containing packages, goods, cargo, containers etc. (hereafter "packages 420") can be unloaded onto the loading dock 405 via the dock opening 406. As illustrated in FIG. 4, the vehicle 400 is backed up close to the dock opening 406, so that packages 420 can be unloaded from the vehicle 400 onto the conveyor belt 412. As described above, multiple sensors 414-418 may be arranged about a conveyor belt 412 to measure an unpacked depth of the vehicle 400. The conveyor belt 412 is configured to transport packages 420 from the vehicle 400 onto the loading dock area. The conveyor belt 412 may be disposed at the loading dock away from the vehicle 400 to allow room or space for a person to unload packages 420 before placing them on the conveyor belt 412. In an example embodiment, the sensors 414-418 are distance sensors. In an example embodiment, sensor 414 measures distance e between an first end of the conveyor belt 412 and the packages 420. In an example embodiment, the sensors 415-418 sense a package 420 on the conveyor belt as it is transported from the vehicle 400 to the unloading area. In another embodiment, sensors 415-418 may also measure distance f, g, h, and i, respectively, between the respective sensor and the packages 420. Thus, as illustrated in FIG. 4, multiple sensors are arranged about a conveyor belt to measure data related to an unpacked depth of a vehicle or trailer.

Figure 5:
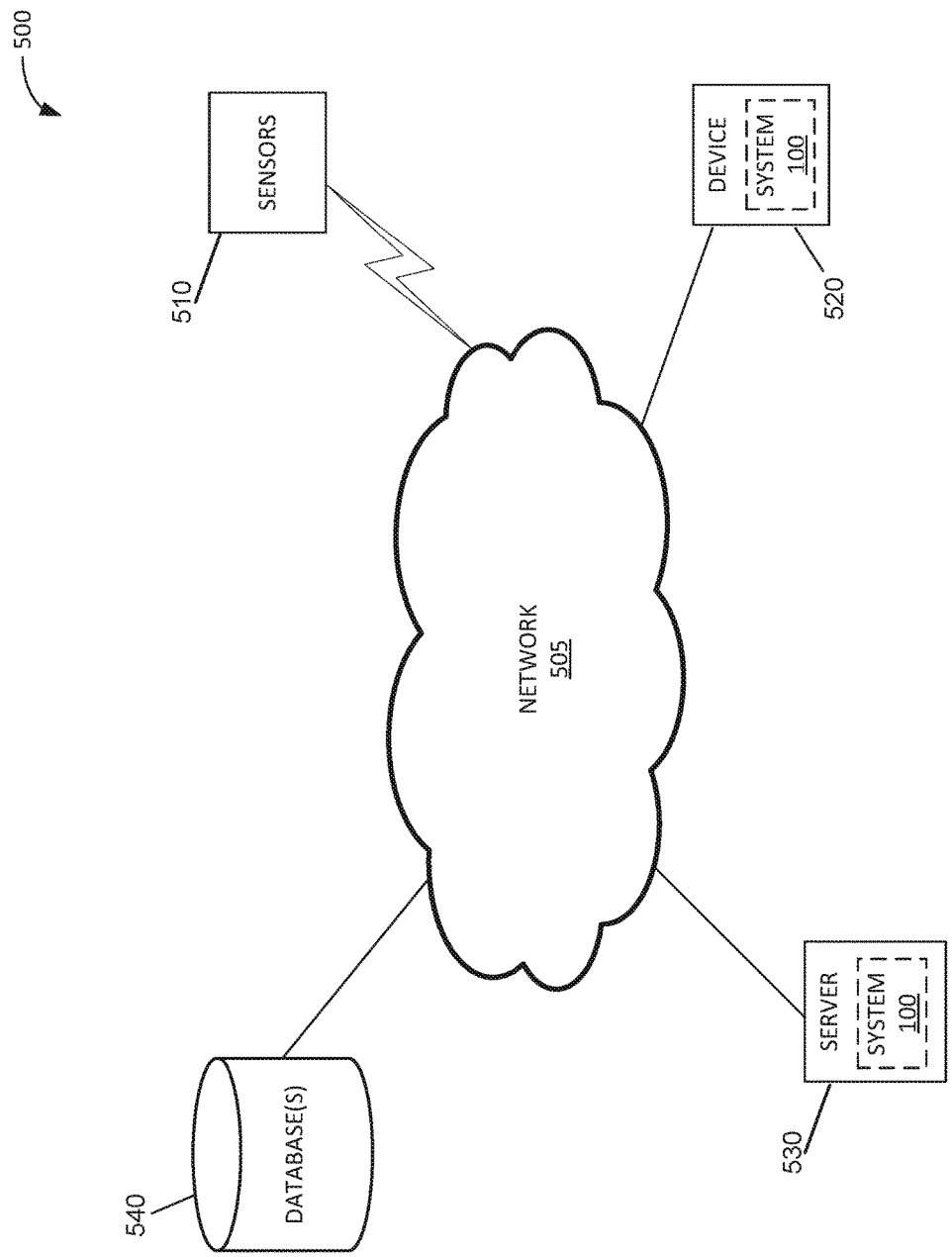
FIG. 5 is a diagram of an exemplary network environment suitable for a distributed implementation of exemplary embodiments.

FIG. 5 illustrates a network diagram depicting a system 500 for implementing the sensor system, according to an example embodiment. The system 500 can include a network 505, sensors 510, device 520, server 530, and a database(s) 540. Each of sensors 510, device 520, servers 530, and database(s) 540 is in communication with the network 505.

In an example embodiment, one or more portions of network 505 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The sensors 510 may be distance sensors configured to measure a distance between itself and another object. The sensors 510 may comprise, but is not limited to, reflective sensors, reflective IR sensors, optical sensors, acoustic sensors, and the like. The sensors 510 may be coupled to a transducer. The sensors 510 may connect to network 505 via a wired or wireless connection. The sensors 510 may be sensors 311-318 of FIG. 3 or sensors 414-418 of FIG. 4.

The device 520 may comprise, but is not limited to, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, network PCs, mini-computers, and the like. The device 520 may connect to network 505 via a wired or wireless connection. The device 520, may include one or more applications such as, but not limited to, a web browsing application, one or more components of the sensor system 100 described herein, and the like. In an example embodiment, the device 520 may perform all the functionalities described herein. The device 520 can include one or more components of computing device 600 of FIG. 6.

In other embodiments, the sensor system 100 may be included on the server 530, and the server 530 performs the functionalities described herein. In yet another embodiment, the device 520 may perform some of the functionalities, and server 530 performs the other functionalities described herein. For example, device 520 may receive measured data generated by the plurality of sensors 510 and determine an empty volume over time of the vehicle or trailer based on the measured data as packages are being unpacked from the vehicle or trailer, while server 530 generates instructions regarding loading packages in a subsequent vehicle or trailer based on the determined empty volume over time of the vehicle or trailer.

Each of the database(s) 540, and server 530 is connected to the network 505 via a wired connection. Alternatively, one or more of the database(s) 540, and server 530 may be connected to the network 505 via a wireless connection. Server 530 comprise one or more computers or processors configured to communicate with sensors 510 and/or device 520 via network 505. Server 530 hosts one or more applications or websites accessed by device 520 and/or facilitates access to the content of database(s) 540. Database(s) 540 comprise one or more storage devices for storing data and/or instructions (or code) for use by server 530, and/or device 520. Database(s) 540 and server 530 may be located at one or more geographically distributed locations from each other or from device 520. Alternatively, database(s) 540 may be included within server 530.

Figure 6:
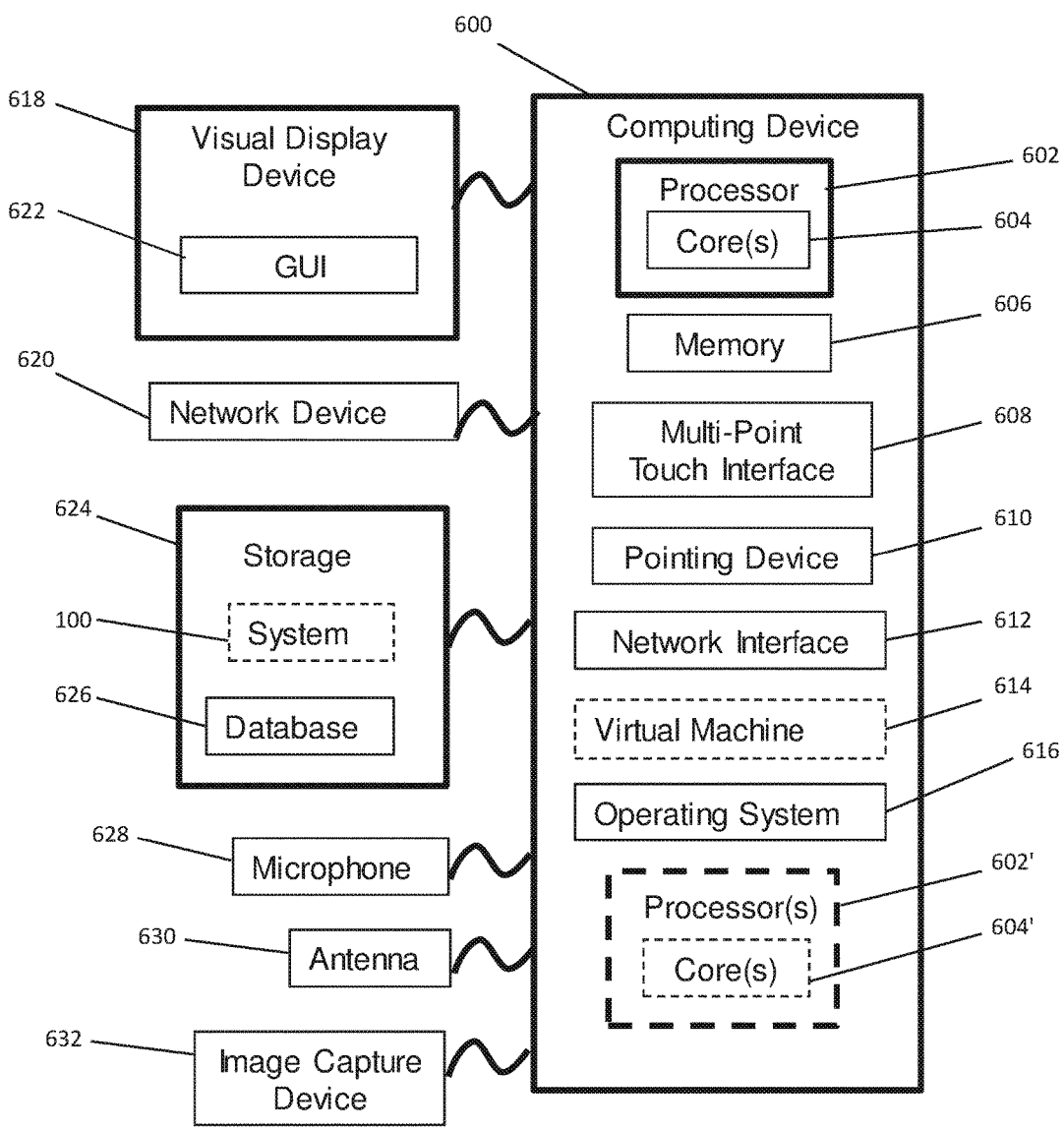
FIG. 6 is a block diagram of an exemplary computing device that may be used to implement exemplary embodiments described herein.

FIG. 6 is a block diagram of an exemplary computing device 600 that can be used to perform any of the methods provided by exemplary embodiments. The computing device 600 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more USB flashdrives), and the like. For example, memory 606 included in the computing device 600 can store computer-readable and computer-executable instructions or software for implementing exemplary embodiments. The computing device 600 also includes processor 602 and associated core 604, and optionally, one or more additional processor(s) 602' and associated core(s) 604' (for example, in the case of computer systems having multiple processors/cores), for executing computer-readable and computer-executable instructions or software stored in the memory 606 and other programs for controlling system hardware. Processor 602 and processor(s) 602' can each be a single core processor or multiple core (604 and 604') processor.

Virtualization can be employed in the computing device 600 so that infrastructure and resources in the computing device can be shared dynamically. A virtual machine 614 can be provided to handle a process running on multiple processors so that the process appears to be using only one computing resource rather than multiple computing resources. Multiple virtual machines can also be used with one processor.

Memory 606 can include a computer system memory or random access memory, such as DRAM, SRAM, EDO RAM, and the like. Memory 606 can include other types of memory as well, or combinations thereof.

A user can interact with the computing device 600 through a visual display device 618, such as a touch screen display or computer monitor, which can display one or more user interfaces 619 that can be provided in accordance with exemplary embodiments. The visual display device 618 can also display other aspects, elements and/or information or data associated with exemplary embodiments. The computing device 600 can include other I/O devices for receiving input from a user, for example, a keyboard or any suitable multi-point touch interface 608, a pointing device 610 (e.g., a pen, stylus, mouse, or trackpad). The keyboard 608 and the pointing device 610 can be coupled to the visual display device 618. The computing device 600 can include other suitable conventional I/O peripherals.

The computing device 600 can also include one or more storage devices 624, such as a hard-drive, CD-ROM, or other computer readable media, for storing data and computer-readable instructions and/or software, such as the system 100 that implements exemplary embodiments of the sensor system described herein, or portions thereof, which can be executed to generate user interface 619 on display 618. Exemplary storage device 624 can also store one or more databases for storing any suitable information required to implement exemplary embodiments. The databases can be updated by a user or automatically at any suitable time to add, delete or update one or more items in the databases. Exemplary storage device 624 can store one or more databases 626 for storing data measured by the sensors, an empty volume determined by system 100, and any other data/information used to implement exemplary embodiments of the systems and methods described herein.

The computing device 600 can include a network interface 612 configured to interface via one or more network devices 622 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 612 can include a built-in network adapter, network interface card, PCMCIA network card, card bus network adapter, wireless network adapter, USB network adapter, modem or any other device suitable for interfacing the computing device 600 to any type of network capable of communication and performing the operations described herein. Moreover, the computing device 600 can be any computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The computing device 600 can run any operating system 616, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 616 can be run in native mode or emulated mode. In an exemplary embodiment, the operating system 616 can be run on one or more cloud machine instances.

The following description is presented to enable any person skilled in the art to create and use a computer system configuration and related method and systems for a sensor system for a cargo or goods vehicle or trailer. Various modifications to the example embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention may be practiced without the use of these specific details. In other instances, well-known structures and processes are shown in block diagram form in order not to obscure the description of the invention with unnecessary detail. Thus, the present disclosure is not intended to be limited to the embodiments shown, but is to be accorded the widest scope consistent with the principles and features disclosed herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps can be replaced with a single element, component or step. Likewise, a single element, component or step can be replaced with a plurality of elements, components or steps that serve the same purpose. Moreover, while exemplary embodiments have been shown and described with references to particular embodiments thereof, those of ordinary skill in the art will understand that various substitutions and alterations in form and detail can be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods can include more or fewer steps than those illustrated in the exemplary flowcharts, and that the steps in the exemplary flowcharts can be performed in a different order than the order shown in the illustrative flowcharts.

What is claimed is:
1. A sensor system comprising:
 a first plurality of sensors arranged about an opening associated with a door through which packages are unloaded from a vehicle or trailer, the first plurality of sensors being configured to measure an unpacked depth of the vehicle or trailer;
 a conveyer belt system including a second plurality of sensors; and
 a processor in communication with each of the first plurality of sensors, the second plurality of sensors, a display device, wherein the processor is configured to:

receive first measured data generated by the first plurality of sensors;
determine an empty volume over time of the vehicle or trailer based on the first measured data as packages are being unpacked from the vehicle or trailer;
determine a rate of unloading or unpacking based on measured data generated by the second plurality of sensors on the conveyor belt; and
generate instructions regarding loading packages in a subsequent vehicle or trailer based on the determined empty volume over time of the vehicle or trailer.

2. The system of claim 1, wherein each of the first plurality of sensors is a distance measuring sensor.

3. The system of claim 1, wherein the first plurality of sensors are disposed at the door in a horizontal array and a vertical array to form a grid arrangement.

4. The system of claim 1, wherein the door is associated with a loading dock, and the processor is configured to:
determine an amount of time spent to move a package from a first location inside of the vehicle or trailer to a second location onto the loading dock.

5. The system of claim 1, wherein the conveyor belt has a first end configured to be disposed in the vehicle or trailer and a second end configured to be disposed proximate to the door, the conveyor belt configured to transport a package from the vehicle or trailer through the door.

6. The system of claim 5, wherein the second plurality of sensors on the conveyor belt configured to sense location of the package on the belt.

7. The system of claim 1, wherein the processor is further configured to:
determine a first rate of unloading or unpacking corresponding to the vehicle or trailer based on the empty volume over time;
determine a second rate of unloading or unpacking corresponding to the subsequent vehicle or trailer; and
compare the first rate and the second rate to determine efficiency of unloading or unpacking the subsequent vehicle or trailer.

8. The system of claim 1, wherein the processor is further configured to:
detect a safety issue associated with unloading the cargo container based on the first measured data; and
generate an alert to provide a warning related to the safety issue.

9. The system of claim 1, wherein the first plurality of sensors includes at least one sensor configured to oscillate along a length or width of the opening.

10. A computer-implemented method comprising:
receiving first measured data generated by a first plurality of sensors arranged about an opening associated with a door through which packages are unloaded from a vehicle or trailer, the first plurality of sensors being configured to measure an unpacked depth of the vehicle or trailer;
determining an empty volume over time of the vehicle or trailer based on the first measured data as packages are being unpacked from the vehicle or trailer;
determining a rate of unloading or unpacking based on measured data generated by a second plurality of sensors on a conveyor belt; and
generating instructions regarding loading packages in a subsequent vehicle or trailer based on the determined empty volume over time of the vehicle or trailer.

11. The method of claim 10, wherein each of the first plurality of sensors is a distance measuring sensor.

12. The method of claim 10, wherein the first plurality of sensors are disposed at the door in a horizontal array and a vertical array to form a grid arrangement.

13. The method of claim 10, wherein the door is associated with a loading dock, and further comprising:
determining an amount of time spent to move a package from a first location inside of the vehicle or trailer to a second location onto the loading dock.

14. The method of claim 10, further comprising:
sensing a location of a package on the conveyor belt has a first end configured to be disposed in the vehicle or trailer and a second end configured to be disposed proximate to the door, the conveyor belt configured to transport packages from the vehicle or trailer through the door.

15. The method of claim 10, further comprising:
determining a first rate of unloading or unpacking corresponding to the vehicle or trailer based on the empty volume over time;
determining a second rate of unloading or unpacking corresponding to the subsequent vehicle or trailer; and
comparing the first rate and the second rate to determine efficiency of unloading or unpacking the subsequent vehicle or trailer.

16. A sensor system comprising:
a sensor arranged about an opening associated with a door through which packages are unloaded from a vehicle or trailer, the sensor being configured to oscillate along the width or length of the opening to measure an unpacked depth of the vehicle or trailer;
a processor in communication with the sensor, wherein the processor is configured to:
receive first measured data generated by the sensor;
determine an empty volume over time of the vehicle or trailer based on the first measured data as packages are being unpacked from the vehicle or trailer; and
generate instructions regarding loading packages in a subsequent vehicle or trailer based on the determined empty volume over time of the vehicle or trailer.

17. The system of claim 16, wherein the sensor is configured to oscillate along a bottom, sides, or top of the opening.

18. The system of claim 16, wherein the door is associated with a loading dock, and the processor is configured to:
determine an amount of time spent to move a package from a first location inside of the vehicle or trailer to a second location onto the loading dock.

19. The system of claim 16, wherein the processor is further configured to:
determine a first rate of unloading or unpacking corresponding to the vehicle or trailer based on the empty volume over time;
determine a second rate of unloading or unpacking corresponding to the subsequent vehicle or trailer; and
compare the first rate and the second rate to determine efficiency of unloading or unpacking the subsequent vehicle or trailer.

20. The system of claim 16, wherein the processor is further configured to:
detect a safety issue associated with unloading the cargo container based on the first measured data; and
generate an alert to provide a warning related to the safety issue.

* * * * *